United States Patent [19]

Allred

[11] 4,335,534
[45] Jun. 22, 1982

[54] TROTLINE GUIDE

[76] Inventor: Roe Allred, Box 544, Munday, Tex. 76371

[21] Appl. No.: 160,319

[22] Filed: Jun. 17, 1980

[51] Int. Cl.³ .............................................. A01K 79/00
[52] U.S. Cl. ........................................ 43/27.4; 43/6.5; 254/389
[58] Field of Search .................. 43/27 A, 6.5; 269/21, 269/95, 97, 71, 231, 66; 254/389, 134.3 R; 242/157 R, 137.1; 248/225.4, 441 R, 466, 242, 362, 363

[56] References Cited

U.S. PATENT DOCUMENTS

| 2,164,803 | 7/1939 | Duraffourg | 242/157 R |
| 2,366,931 | 1/1945 | Plain | 248/363 |
| 3,896,579 | 7/1975 | Benne | 43/27.4 |

FOREIGN PATENT DOCUMENTS

| 255882 | 1/1913 | Fed. Rep. of Germany | 248/242 |
| 302951 | 12/1928 | United Kingdom | 248/242 |

*Primary Examiner*—Robert C. Watson
*Attorney, Agent, or Firm*—Victor J. Evans & Co.

[57] ABSTRACT

A trotline guide comprising a substantially planar body having a recess in the upper edge including a circular portion and a slot for receiving and slidably accommodating a trotline together with a clamp on one side of the body for clamping the body to a hull of a fishing vessel so as to extend outwardly from the hull side wall perpendicular thereto in a substantially vertical plane with a spacing device on the one side of the body for engagement with the hull side wall to orient the body in the vertical plane.

9 Claims, 4 Drawing Figures

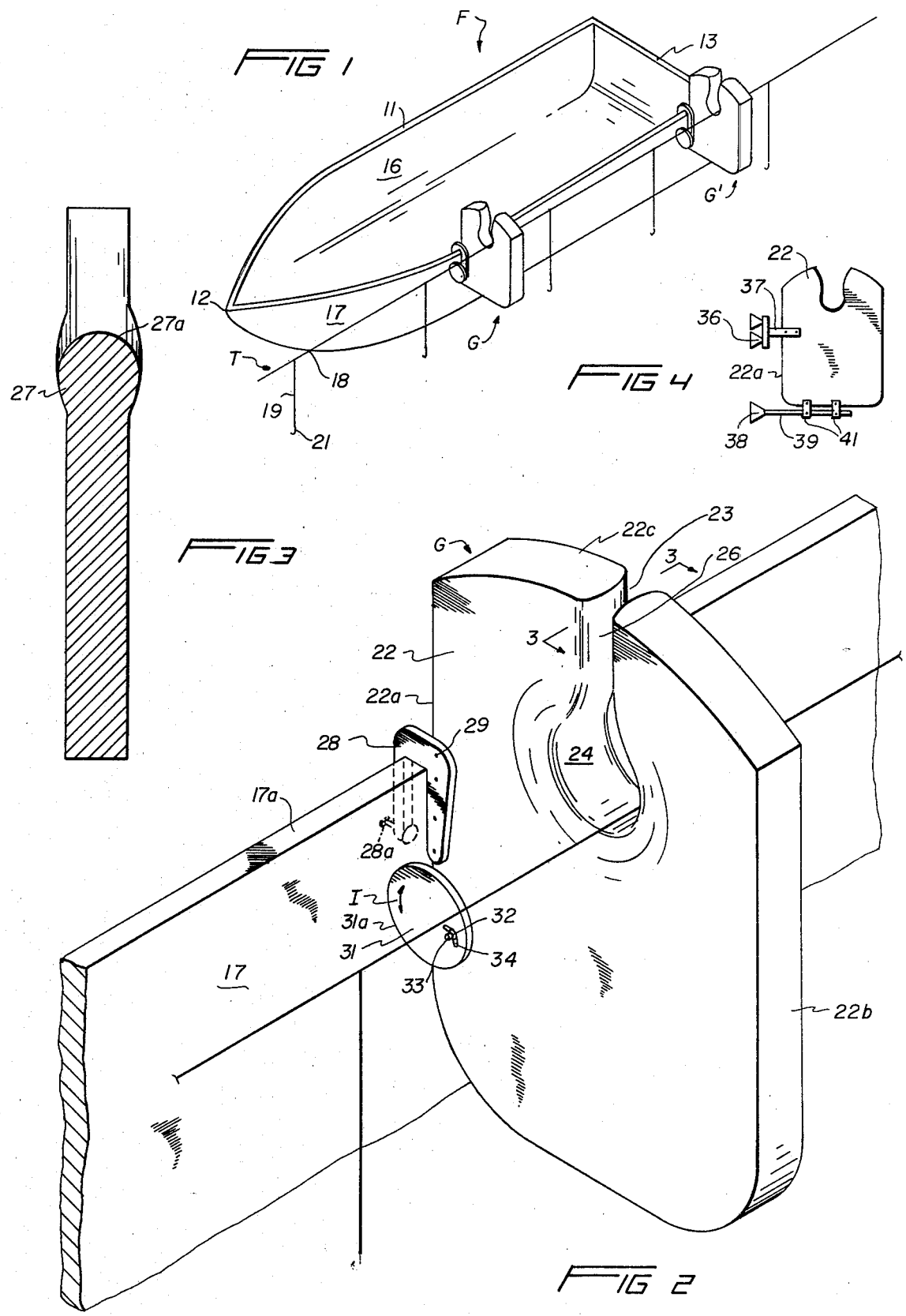

TROTLINE GUIDE

BACKGROUND OF THE INVENTION

A common type of fishing is referred to as trotline fishing in which an extremely long main line is provided with leaders attached to the main line at spaced intervals, the lower ends of the leaders being provided with a hook. Such a trotline is manipulated from a fishing vessel such as a small boat or the like. In trotline fishing, the fishing boat is provided with a suitable guide for accommodating the trotline as the boat is moved in the water so that in setting out the trotline, the fisherman may quickly and easily bait the hooks sequentially for subsequent introduction of the baited trotline into the water. Similarly, the fisherman uses the boat and guide to remove fish from the hooks sequentially as the boat advances in the water along the trotline. Various devices have been proposed for lifting, supporting and guiding a trotline to a position within easy reach of a fisherman for inspecting or servicing the trotline from the fishing vessel among which are those shown in U.S. Pat. No. 3,896,579 issued to James K. Benne, U.S. Pat. No. 3,626,627 issued to T. W. Osborne and U.S. Pat. No. 3,775,894 issued to Robert V. Goddard. Such present day devices are characterized by various limitations among which are complexity in construction, susceptible to wear and possible jamming and requiring considerable care in the trotline fishing operation to avoid line entanglement and injury from the hooks thereby prolonging the time required for both deploying the trotline and for removing fish from the hooks.

OBJECTS AND SUMMARY OF THE INVENTION

Accordingly, a primary object of this invention is to provide a new and novel trotline guide for attachment to a fishing vessel which is simple and easy to operate.

Another object of this invention is to provide a new and novel trotline guide for a fishing vessel which is simple and inexpensive in construction, which may be attached to a fishing boat in a simple and easy manner and which permits a trotline fishing operation to be carried out in a minimum of time.

A still further object of this invention is to provide a new and novel trotline guide which virtually eliminates entanglement of the trotline and which eliminates any safety hazard to the fisherman handling the trotline hooks.

A still further object of this invention is to provide a new and novel trotline guide for a fishing vessel which requires a minimum of attention in its use on the part of the fisherman and which may be utilized without modification with a wide variety of hull shapes and constructions.

The objects of the invention and other related objects are accomplished by the provision of a substantially planar body having side edges and a top edge with a recess in the body top edge having a circular portion and an upwardly opening slot extending from the circular portion for accommodating a trotline. Means are provided on one of the body side edges for clamping the body to the side of a fishing vessel with the body extending substantially perpendicular to the side wall of the hull and with the body extending in a substantially vertical plane. The body also includes adjustable means on the body one side edge which are engageable with the hull side wall for orienting the body in a substantially vertical plane.

The above-mentioned and other features and objects of the present invention will become more apparent by reference to the following description taken in conjunction with the accompanying drawings wherein like reference numerals denote like elements.

BRIEF DESCRIPTION OF THE DRAWINGS

FIG. 1 is a perspective view of a fishing vessel with the trotline guide of the invention mounted thereon in a operating position;

FIG. 2 is a enlarged perspective view of the trotline guide of the invention shown in the operative position of FIG. 1;

FIG. 3 is a sectional view taken substantially along line 3—3 of FIG. 2 in the direction of the arrows; and FIG. 4 is a elevation view of a modification of the trotline guide of the invention.

DESCRIPTION OF THE PREFERRED EMBODIMENT

Referring now to the drawings and to FIG. 1 in particular there is shown a fishing vessel of conventional construction designated generally by the letter F. The fishing vessel F is of the conventional type used in trotline fishing such as a dinghy, small boat or the like and includes a hull 11 having a bow 12, a stern 13 and side walls 16, 17. As specifically illustrative of the invention, there is shown in FIG. 1 a trotline guide, designated generally by the letter G in an installed position on the fishing boat F. In the preferred use of the trotline guide of the invention, a further trotline designated generally by the letter G' is also mounted on the fishing boat F in longitudinally spaced relationship with the trotline guide G as shown.

Referring now to FIG. 2, the trotline guide G is shown in the installed position on the side wall 17 of the fishing boat hull 11 for servicing a trotline T having a main line 18 and leaders 19 attached thereto in longitudinally spaced relationship with a hook 21 at the free ends of each of the leaders 19 in the well known manner. The trotline guide G includes a substantially planar body 22 preferably molded of synthetic resinous material such as plastic or the like in a one-piece construction. The body 22 includes side edges 22a, 22b and a top edge 22c. A recess designated generally by the reference numeral 23 is provided in the body top edge 22c and includes a circular portion 24 and an upwardly opening slot 26 extending from the circular portion 24 for accommodating the main line 18 of the trotline T.

As shown best in FIG. 3, the marginal edge portion 27 of the body 22 defining the recess 23 is preferably substantially tear shaped in cross section to provide an arcuately shaped inner edge 27a and is of greater thickness than the adjacent portions of the body 22 to facilitate the passage of the trotline T through the recess 23.

The trotline guide G of the invention also includes means for clamping the body 22 to the hull 11 of the fishing vessel F with the body extending substantially perpendicular to the side wall 17 of the hull 11 and so as to extend in a substantially vertical plane. More specifically, in the embodiment of FIGS. 1, 2, such clamping means includes a C-clamp 28 secured to the body 22 by means such as rivets 29 adjacent the body side edge 22a. The C-clamp 28 is mounted on the gunwale 17a of the side wall 17 and a clamping jaw 28a on the C-clamp 28 moved into clamping engagement with the inner surface of the side wall 17 in the conventional manner. Thus, in the mounted position, the trotline guide body 22 extends outwardly from the side wall 17 in perpendicular relationship thereto and in a substantially vertical plane with the recess 23 opening upwardly for receiving the trotline T.

The trotline guide G of the invention also includes adjustable means on the body 22 which are engageable with the hull side wall 17 for orienting the body 22 in a substantially vertical plane. More specifically, in the embodiment of FIGS. 1, 2, a disc 31 is rotatably mounted on the body 22 below the C-clamp 28 adjacent the body side edge 22a on an eccentric axis defined by a shaft 32 having a threaded upper end 33. The peripheral edge 31a of the disc 31 is arranged to abuttingly engage the side wall 17 of the fishing boat F. As a result of the eccentric mounting on the disc 31, rotation of the disc in a direction as indicated by the double arrow I, the disc 31 may be positioned in a selected rotary position for predetermining the spacing between the body side edge 22a and the hull side wall 17. Means are provided for clamping the disc 31 in the selected rotary position which, in the illustrated embodiment, comprise a wing nut 34 threadially engageable with the threaded shaft portion 33 so that when the disc 31 has been rotated to the selected rotary position, the wing nut 34 is tightened to bind the disc 31 nonrotatably against the underlying surface of the body 22.

FIG. 4 shows another embodiment of the trotline guide of the invention wherein like numerals are used to identify like parts. In the embodiment of FIG. 4, the clamping means for clamping the body 22 to the hull side wall 17 comprises at least one, preferably, two suction cups 36 secured by means of a bracket 27 to the body 22 adjacent the body side edge 22a. Thus, the body 22 may be clamped by vacuum pressure to the side wall 17. The embodiment of FIG. 4 also includes adjustable means for orienting the body 22 in a vertical plane which includes a suction cup 38 mounted on one end of a rod 39 arranged for axial adjustment on the body by means of brackets 41. The brackets 41 are provided with a suitable wing nut or the like for releasing and clamping the rod 39 for adjusting the position of the suction cup 38 with respect to the hull side wall 17.

Having thus described the preferred embodiment of the invention it should be understood that numerous structural modifications and adaptations may be resorted to without departing from the spirit of the invention.

What is claimed is:

1. A trotline guide for allowing a main trotline with plural depending leaders having hooks to pass therethrough comprising, in combination, a substantially planar body having side edges and a top edge, said body top edge having a recess including a circular portion and a upwardly opening slot extending from said circular portion for accommodating the trotline and means for clamping said body to the hull of a fishing vessel with said body extending substantially perpendicular to the side wall of said hull and in a substantially vertical plane wherein a marginal edge portion of said body defining said recess is of arcuate shape having a smooth contour and of greater thickness than the adjacent portions of said body to facilitate the passage of the trotline through said recess and wherein said body marginal edge portion is substantially tear shape in cross section so that hooks passing through said recess encounter no obstructions upon which they may get ensnared.

2. A trotline guide in accordance with claim 1 including adjustable means on said body one side edge engageable with said hull side wall for orienting said body and said opening slot in said substantially vertical plane.

3. A trotline guide in accordance with claim 2 wherein said body is formed of molded plastic material in a one-piece construction.

4. A trotline guide in accordance with claim 2 wherein said adjustable means comprise a disc rotatably mounted on said body adjacent said one side edge on an eccentric axis, said disc having a peripheral edge engageable with said hull side wall to maintain said body one side edge in a selected spaced-apart relationship with said hull side wall and means for clamping said disc in a selected rotary position for varying the space-apart relationship between said body one side edge and said hull side wall in accordance with the contour of said hull side wall.

5. A trotline guide in accordance with claim 4 wherein said body clamping means comprises a C-clamp.

6. A trotline guide in accordance with claim 5 wherein a pair of said trotline guides are provided, each of said pair of guides being arranged to be clamped to said hull by said clamping means in longitudinally spaced, aligned relationship for guiding the passage of said trotline through said recesses whereby the trotline between said pair of guides run substantially horizontally.

7. A trotline guide in accordance with claim 3 wherein said body clamping means comprise at least one suction cup mounted on said body in spaced relationship with said body one side edge for vacuum clamping of said body to said hull side wall.

8. A trotline guide in accordance with claim 7 wherein said adjustable means comprise a further suction cup mounted on said body in spaced-apart relationship with said one side edge for suction engagement with said hull side wall and means for moving said further suction cup into a selected spaced relationship with said body one side edge in accordance with the contour of said hull side wall.

9. The device of claim 8 wherein said means for moving said further suction cup includes a rod extending from said further suction cup frictionally engaged to said guide at a lower edge thereof by brackets on said guide to allow axial motion of said rod.

* * * * *